United States Patent
Riddick et al.

(10) Patent No.: US 11,725,932 B2
(45) Date of Patent: Aug. 15, 2023

(54) VIDEO EXTENSOMETER SYSTEM WITH REFLECTIVE BACK SCREEN

(71) Applicant: Illinois Tool Works Inc., Glenview, IL (US)

(72) Inventors: Adrian Charles Riddick, Medfield, MA (US); Nicholas Francisco Salerno, Brighton, MA (US); Michael Ashman, Natick, MA (US); Christian J. Hoehl, Ober-Ramstadt (DE)

(73) Assignee: Illinois Tool Works Inc., Glenview, IL (US)

( * ) Notice: Subject to any disclaimer, the term of this patent is extended or adjusted under 35 U.S.C. 154(b) by 509 days.

(21) Appl. No.: 16/894,113

(22) Filed: Jun. 5, 2020

(65) Prior Publication Data

US 2020/0408509 A1    Dec. 31, 2020

Related U.S. Application Data

(60) Provisional application No. 62/866,379, filed on Jun. 25, 2019.

(51) Int. Cl.
*G01B 11/16*     (2006.01)
*H04N 7/18*      (2006.01)
*G06T 7/13*      (2017.01)

(52) U.S. Cl.
CPC ............... *G01B 11/16* (2013.01); *G06T 7/13* (2017.01); *H04N 7/183* (2013.01);
(Continued)

(58) Field of Classification Search
CPC ......... G01B 11/16; G01B 11/165; G06T 7/13; G06T 2207/10048; G06T 2207/30204;
(Continued)

(56) References Cited

U.S. PATENT DOCUMENTS

| | | | | |
|---|---|---|---|---|
| 4,953,973 A | * | 9/1990 | Leftheris | G01N 3/068 73/800 |
| 5,568,259 A | * | 10/1996 | Kamegawa | G01B 11/16 356/625 |
| 2018/0216929 A1 | | 8/2018 | Hoehl | |

FOREIGN PATENT DOCUMENTS

| | | |
|---|---|---|
| DE | 3819058 | 12/1989 |
| EP | 2990775 | 3/2016 |

(Continued)

OTHER PUBLICATIONS

Int'l Search Report and Written Opinion Appln. No. PCT/US2020/036785 dated Sep. 17, 2020.

*Primary Examiner* — Jonathan M Hansen
(74) *Attorney, Agent, or Firm* — McAndrews, Held & Malloy, Ltd.

(57) ABSTRACT

The present disclosure describes systems and methods for conducting deformation (e.g., extension and/or strain) measurements based on characteristics of a test specimen using light sourced from a single side of a test specimen. The light source and an imaging device are arranged on a single side of the test specimen relative to a back screen while the light source illuminates both a front surface of the test specimen and the back screen. The back screen reflects light to create a silhouette of the test specimen. The imaging device captures images of one or more markers on a front surface of the test specimen, as well as measuring position of the markers during the testing process. The imaging device also measures relative changes in position of the edges of the test specimen during the testing process, by analyzing the edges of the silhouetted image created by the reflective back screen.

20 Claims, 3 Drawing Sheets

(52) U.S. Cl.
CPC ............... *G01N 2203/0016* (2013.01); *G01N 2203/0647* (2013.01); *G06T 2207/10048* (2013.01); *G06T 2207/30204* (2013.01)

(58) Field of Classification Search
CPC ................... H04N 7/183; H04N 7/181; G01N 2203/0016; G01N 2203/0647; G01N 3/08; G01N 3/068
See application file for complete search history.

(56) References Cited

FOREIGN PATENT DOCUMENTS

| | | |
|---|---|---|
| FR | 3011929 | 4/2015 |
| WO | 2015104983 | 7/2015 |
| WO | 2016018541 | 2/2016 |

\* cited by examiner

VIDEO EXTENSOMETER SYSTEM WITH REFLECTIVE BACK SCREEN

CROSS REFERENCE TO RELATED APPLICATIONS

This application is a Non-Provisional Patent Application which claims priority to U.S. Provisional Patent Application No. 62/866,379, entitled "Video Extensometer System With Reflective Back Screen", filed Jun. 25, 2019, the contents of which are herein incorporated by reference in their entirety.

BACKGROUND

Camera based vision systems have been implemented as part of materials testing systems, for measurement of specimen strain. These systems collect one or more images of a specimen under test, with these images being synchronized with other signals of interest for the test (e.g., specimen load, machine actuator/crosshead displacement etc.). The images of the test specimen can be analyzed to locate and track specific features of the specimen as the test progresses. Changes in the location of such features allows local specimen deformation to be calculated and in turn specimen strain to be computed.

Conventional systems employ backlit screens and/or multiple light sources to direct light onto multiple surface and/or sides of the test specimen. Such a system requires a complex arrangement of lights and cameras, as well as one or more purpose-built backlit screens to locate and track features of the specimen, which increases cost, invites errors in system set-up, and requires intensive computational resources. Thus, a more direct system of measuring a specimen under test is desirable.

SUMMARY

Disclosed herein are systems and methods for conducting deformation (e.g., extension and/or strain) measurements based on characteristics of a test specimen using light sourced from a defined point of view (e.g., a single side of a test specimen). In some examples, the light source is arranged on a single side of the test specimen relative to a back screen yet configured to illuminate both a front surface of the test specimen and the back screen, which is configured to reflect light from the light source to create a silhouette of the test specimen.

This technique allows the width of the test specimen to be measured in multiple axial locations, providing advantages to "single line" measurement technique. In some examples, a back screen is used in combination with the single light source to define a silhouette of the specimen, as viewed from an imaging device arranged on the same side of the specimen as the light source.

In disclosed examples, a single imaging device or camera captures images of one or more markers on the front surface of the test specimen, as well as measuring position of the markers during the testing process. In some examples, the imaging device also measures relative changes in position of the edges of the test specimen during the testing process, by analyzing the edges of the silhouetted image created by the reflective back screen. In addition, one or more image processing algorithms can be executed, to measure a width of the test specimen by identifying the transition edges of the specimen as they appear as a dark silhouette in front of the illuminated back screen.

It is therefore an object of the present disclosure to develop further improvements with respect to an extensometer system that employs light sourced from a defined point of view and a single imaging device to capture light reflected from one or more markers and/or a reflective back screen.

These and other features and advantages of the present invention will be apparent from the following detailed description, in conjunction with the appended claims.

BRIEF DESCRIPTION OF THE DRAWINGS

The benefits and advantages of the present invention will become more readily apparent to those of ordinary skill in the relevant art after reviewing the following detailed description and accompanying drawings, wherein.

The figures are not necessarily to scale. Where appropriate, similar or identical reference numbers are used to refer to similar or identical components.

DETAILED DESCRIPTION

Figure 2:
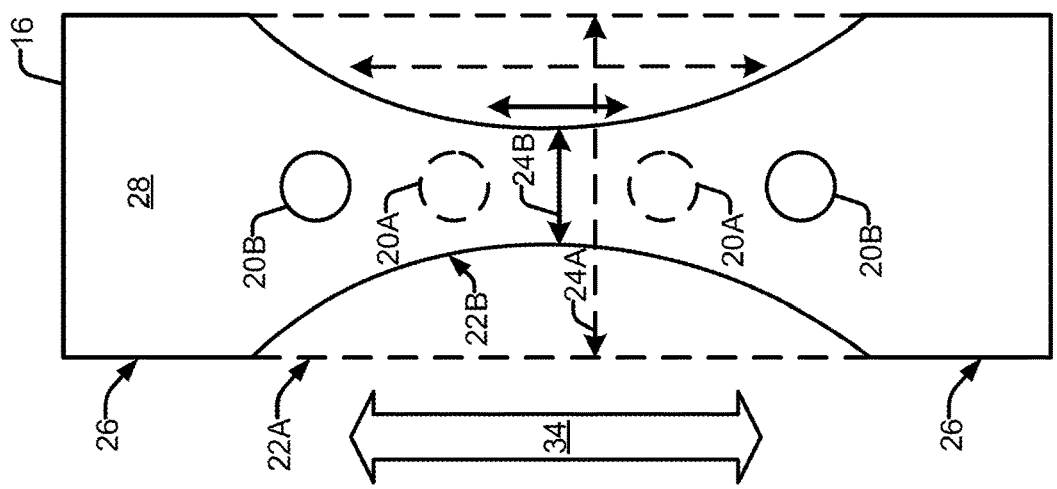
FIG. 2 is an example test specimen for measurement in the extensometer system of FIG. 1, in accordance with aspects of this disclosure.

The present disclosure describes systems and methods for conducting deformation (e.g., extension and/or strain) measurements based on characteristics of a test specimen using light sourced from a defined point of view (e.g., a single side of a specimen). In some examples, the light source is arranged on a single side of the test specimen relative to a back screen yet configured to illuminate both a front surface of the test specimen and the back screen, which is configured to reflect light from the light source to create a silhouette of the test specimen. In disclosed examples, a light source can be employed to provide both front and rear illumination for image capture of a test specimen's features, when combined with a vision-based camera, to perform deformation measurements. In disclosed examples, the characteristics can include the size, shape, and/or absolute or relative location of the markers and/or the edges of the test specimen.

As described herein, material testing systems, including material testing systems that apply tension, compression, and/or torsion, include one or more components that incur displacement and/or load bearing to apply and/or measure stresses on a test specimen. In some examples, a video extensometer system is employed in specimen strain testing, which can include one or more of collecting high resolution images, providing the images to an image processor, analyzing the images to identify one or more specimen characteristics corresponding to deformation, displacement or strain value, and generating an output corresponding to the characteristics. In a disclosed example, the identified characteristics from the one or more collected images are compared against one or more sources, such as a list of threshold values, a comparison of the characteristic from an image collected previously (i.e. prior to testing). In some examples, a value of the identified characteristic may be applied to one or more algorithms to generate an output corresponding to deformation, displacement or strain value associated with the test specimen.

Video processing that employs extensometers may include an external machine vision imaging device connected to a processing system or computing platform and/or video processing hardware and use software and/or hardware to convert the data from the camera to an electrical signal or having a software interface compatible with the materials testing system.

As disclosed herein, camera based image capture (e.g., vision or video) systems are implemented in materials testing systems for measurement of strain on the test specimen. Such systems collect multiple images of the specimen under test (i.e. during a testing process), with the images being synchronized with other signals of interest for the test (such as specimen load, machine actuator and/or crosshead displacement, etc.). The images of the specimen are analyzed (e.g., in real-time and/or post-test) by algorithms to locate and track specific specimen characteristics as the test progresses. For instance, a change in a location, size, shape, etc., of such characteristics allows for test specimen deformation to be calculated, which leads in turn to analysis and calculation of specimen strain.

Specimen characteristics may correspond to markings and/or patterns applied to the surface of the test specimen facing the imaging device. For example, image analysis can be performed by the extensometer system (e.g. via one or more processors) to determine a first or initial location of a mark(s), to track the mark(s) as they move (e.g., relative to one another) as the test progresses. Multiple markings may be applied to the surface of the test specimen facing the imaging device. For example, relative movement of pair groupings is used to gauge length-based strain measurement (i.e. axial marks, transverse marks, etc.). Quasi-random speckle patterns of markers may be used as well applying similar tracking and analysis techniques (e.g., via Digital Image Correlation (DIC) techniques).

As explained herein, conventional systems employ dedicated and precisely controlled rear lighting, which involves creating a consistently lit background (using, for example, an actively lit back screen) positioned directly behind the test specimen as viewed by the extensometer system imaging device. The specimen will then appear as a silhouette against the bright background, and the camera is now able to see a clear delineation of the specimen edges with algorithms applied to make precise specimen width measurements, and in turn compute transverse specimen width deformation during the test.

The invention described in the following sections provides an active lighting solution that enables appropriate lighting conditions to be established for both the front face and background of the specimen, using a single active lighting element.

Conventional video extensometers for tracking and measuring marks on the face of a specimen may use polarizing filters between the front light and the specimen, and between the specimen and imaging lens. This arrangement is to make the marks appear bright against a dark specimen surface. Such systems employ image processing algorithms to determine the locations of the marks on the front of the specimen and thereby calculate the instantaneous specimen gage length as well as the changes in specimen gage length from the value(s) at the start of the test (i.e. axial and/or transverse deformation).

Conventional video extensometers may also track and measure edges of the specimen. For example, the test specimen is silhouetted against a brightly lit background, having a dark appearance to the camera. The image processing algorithms then determine the edges of the specimen and calculate the width of the specimen and track changes in specimen width compared to the initial width at the beginning of the test (i.e. transverse deformation).

As described herein, conventional video extensometers that measure the width of the test specimen require precisely controlled background lighting conditions. This is achieved by including an active backlight system, with its associated cost, mounting requirements as well cable management system. In the case of a video extensometer that will be used to measure features from the front specimen surface (e.g., axial strain markers) as well as the width of the specimen (e.g., transverse specimen edge based strain), there is presently a limitation which imposes the need for two light sources: one to illuminate the front of the test specimen; and one to produce the necessary background illumination to provide a dark specimen silhouette for edge detection.

The present disclosure provides improvements to conventional systems, providing illumination to a test specimen as well as a background to the test specimen by employing light from a single direction and/or a single light source. The disclosed video extensometer system further employs an imaging device to capture images of the test specimen during the test process to measure one or both of a front surface of the test specimen (e.g., one or more marks and/or patterns to calculate axial and/or transverse strain and/or generate strain maps) and edge-based measurements (e.g., to calculate strain based on changes in test specimen width).

In some examples, a single light source (or multiple light sources arranged on a single side of the test specimen relative to the back screen) is used to perform two distinctly separate illumination tasks within the test system. The light source provides even illumination to a surface of the test specimen facing the light source. In some examples, the light source provides light directly toward the surface of the test specimen and the back screen (e.g., at a 90-degree angle to the surface) sufficient to illuminate both. In this manner, marks and/or patterns are applied to that surface are directly illuminated by the light source. Additionally, the light source provides a reflective (i.e. passive) back screen with illumination, which in turn provides a bright background upon which the specimen is silhouetted and contrasted against.

In some examples, the light source is arranged at a non-orthogonal angle to one or both of the test specimen and the back screen. In such an example, a material and/or surface of one or both of the marks, patterns, or back screen may be configured to reflect incident light to an image capture system. For instance, the image capture system may be arranged collinear with the light source, and/or at an angle complementary to the light source (i.e. with respect to an angle of incidence on one or both of the test specimen or the back screen).

The arrangement of components in the disclosed extensometer system provides for capture of both front lit and rear lit specimen features, with the use of a single active lighting source. Backlighting conditions sufficient to create a dark silhouette of the test specimen are achieved by the addition of a simple, low cost, passive back screen. Thus, an advantage over conventional designs that require the addition of expensive secondary active backlight sources.

Moreover, illumination changes and balancing of front and rear relative brightness levels can be achieved by adjustments in the absolute positions and angular orientations of the camera, the light source, test specimen, and/or back screen.

Advantageously, by use of the unique arrangement of components, accurate and consistent tracking of such marks/patterns is achieved without dedicated and precisely controlled light sources for each of the specimen and the screen, as required in conventional systems. Similarly, determination of transverse specimen strain is achieved by identification and tracking of edges of the test specimen during the test process.

In disclosed examples, an extensometer system for measuring deformation on a test specimen includes one or more light sources to direct light to a surface of a test specimen and a screen, wherein the test specimen is arranged between the one or more light sources and the screen; and an imaging device to capture images of the test specimen while subjected to a stress-inducing force via a testing system, the imaging device configured to transmit the images to a processor to calculate deformation of the test specimen as a result of the stress-inducing force.

In some examples, a processor configured to receive two or more images of the test specimen from the imaging device; and compare a first image to a second image to determine a change in a characteristic of the test specimen as a result of the stress-inducing force.

In some examples, the test specimen further comprises one or more markers arranged on the surface of the test specimen. In examples, the characteristic is one of a size, shape or location of the one or more markers. In examples, the characteristic is one of a size, shape or location of an edge of the test specimen.

In some examples, deformation is determined in two orthogonal directions. In examples, deformation is determined in the axial direction and in the transverse direction.

In some examples, the light source emits polarized light or infrared light. In some examples, the imaging device is configured to capture polarized light or infrared light reflected from the screen or the test specimen, wherein the markers reflect light from the light source to the imaging device and the screen reflects light to create a dark silhouette of the test specimen for edge analysis.

In examples, the light source or the imaging device further comprises a filter.

In some examples, an auxiliary camera link connector input for receiving an image of the test specimen, which is subjected to a stress-inducing load. In examples, the processor includes a field programmable gate array. In examples, the processor and the field programmable gate array are located on the single circuit board.

In disclosed examples, an extensometer system for measuring deformation on a test specimen includes a testing system to subject a test specimen to one or more forces; one or more light sources to direct light to a surface of the a test specimen and a screen, wherein the test specimen is arranged between the one or more light sources and the screen; and an imaging device to capture images of the test specimen while subjected to a stress-inducing force via the a testing system, the imaging device configured to transmit the images to a processor to calculate deformation of on the test specimen as a result of the stress-inducing force.

In some examples, the screen further comprises a collimating filter. In some examples, the collimating filter comprises a first collimating filter and a second collimating filter, the first collimating filter arranged in a first orientation on the screen and the second collimating filter arranged in a second orientation on the screen different from the first orientation. In examples, the screen further comprises a reflective filter.

In disclosed examples, an extensometer system for measuring deformation on a test specimen includes a screen comprising a reflective surface; one or more light sources to direct light to a surface of the a test specimen and the reflective surface of the screen, wherein the test specimen is arranged between the one or more light sources and the screen; and an imaging device to capture images of the test specimen while subjected to a stress-inducing force via a testing system, wherein the images are generated from light reflected from one or markers on the test specimen or from light reflected from the screen to create a silhouette of the test specimen.

In some examples, the imaging device is configured to transmit the images to a processor to calculate deformation of on the test specimen as a result of the stress-inducing force. In examples, a testing system to subject the test specimen to one or more forces to provide the stress-inducing force.

As used herein, a "crosshead" refers to a component of a material testing system that applies directional (axial) and/or rotational force to a specimen. A material testing system may have one or more crossheads, and the crosshead(s) may be located in any appropriate position and/or orientation in the material testing system.

Figure 1:
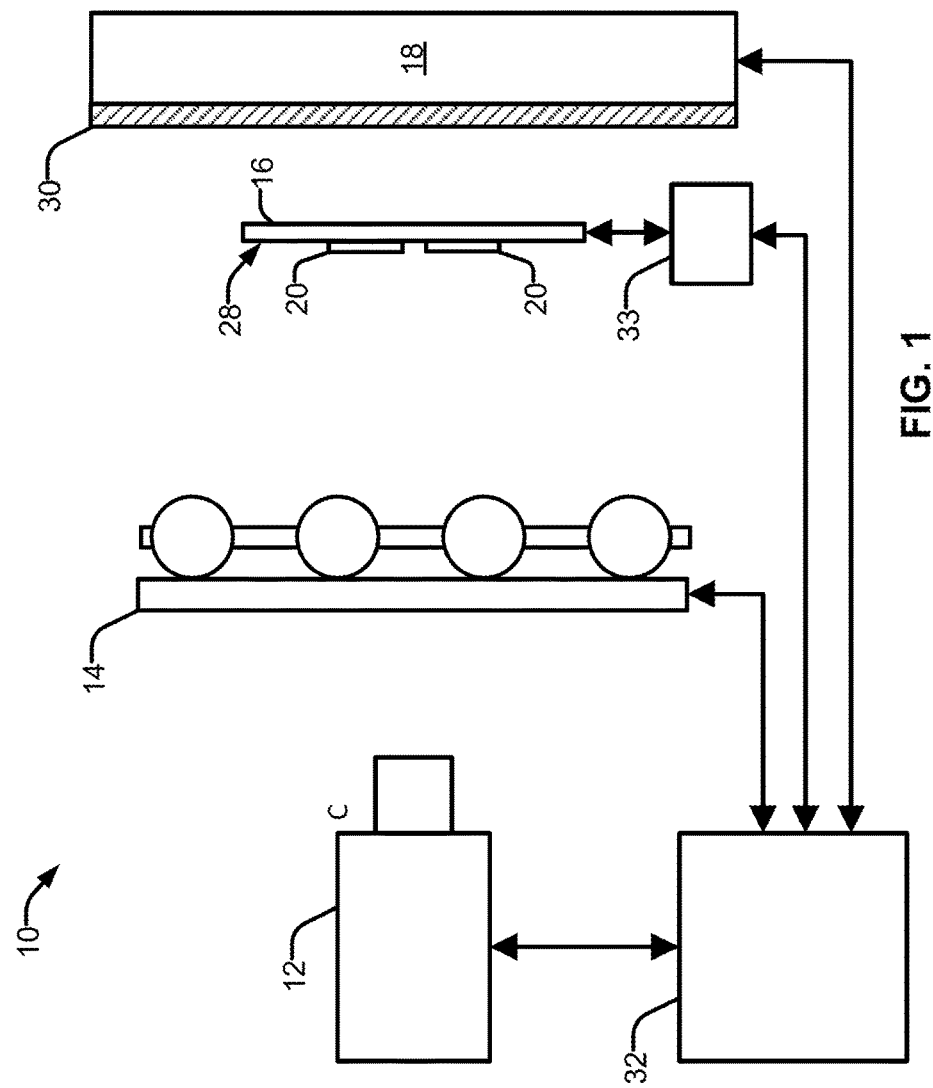
FIG. 1 is a block diagram of an example extensometer system, in accordance with aspects of this disclosure.

Referring now to the figures, FIG. 1 is an example extensometer system 10 to measure changes to one or more characteristics of a test specimen 16 undergoing a mechanical property testing. The example extensometer system 10 may be connected to, for example, a testing system 33 capable of mechanical testing of the test specimen 16. The extensometer system 10 may measure and/or calculate changes in the test specimen 16 subjected to, for example, compression strength testing, tension strength testing, shear strength testing, bend strength testing, deflection strength testing, tearing strength testing, peel strength testing (e.g., strength of an adhesive bond), torsional strength testing, and/or any other compressive and/or tensile testing. Additionally, or alternatively, the material extensometer system 10 may perform dynamic testing.

Figure 4:
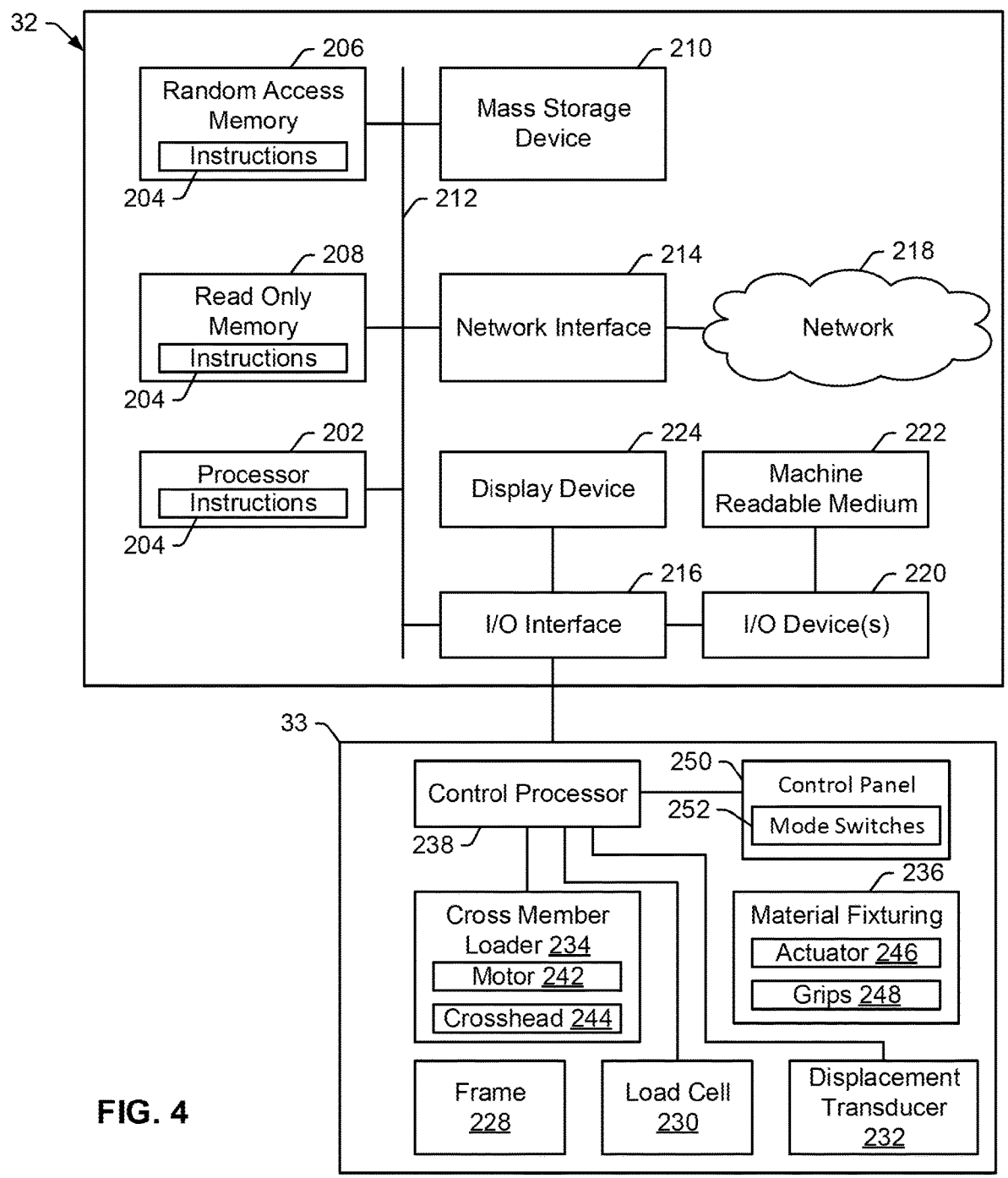
FIG. 4 is a block diagram of an example implementation of the extensometer system of FIG. 1.

In accordance with disclosed examples, the extensometer system 10 may include the testing system 33 for manipulating and testing the test specimen 16, and/or a computing device or processing system 32 communicatively coupled to the testing system 33, the light source, and/or the imaging device, as further shown in FIG. 4. The testing system 33 applies loads to the test specimen 16 and measures the mechanical properties of the test, such as displacement of the test specimen 16 and/or force applied to the test specimen 16.

The extensometer system 10 includes a remote and/or an integral light source 14 (e.g., an LED array) to illuminate the test specimen 16 and/or a reflective back screen 18. The extensometer system 10 includes a processing system 32 (see also FIG. 4) and a camera or imaging device 12. In some examples, the light source 14 and the imaging device 12 are configured to transmit and receive in the infrared (IR) wavelengths; however, other wavelengths are similarly applicable. In some examples, one or both of the light source 14 or the imaging device 12 include one or more filters (e.g., a polarizing filter), one or more lenses. In some examples, a calibration routine is performed (e.g., a two-dimensional calibration routine) to identify one or more characteristics of the test specimen 16, one or more markers 20 (including a pattern of markers), is additionally used.

In some examples, the back screen 18 is configured to reflect light from the light source 14 back to the imaging device 12. For example, a surface of the back screen 18 may be configured with properties to enhance reflection and/or direct reflected light toward the imaging device. Properties can include a shape of the back screen 18 (e.g. in a parabolic configuration), and/or a treatment to increase reflection (e.g., application of cube corner reflectors, a reflective material, etc.). Additionally or alternatively, a filter 30 can be arranged and/or applied to a surface to increase the amount of reflection and/or direct reflected light in a desired direction and/or wavelength.

In some examples, the filter 30 is configured as a collimating filter, to provide as much reflected light as possible toward the imaging device 12 and away from other nearby components. For instance, the collimating filter directs light toward the imaging device 12, regardless of angle of incidence of the light from the light source 14 on the test specimen 16 and/or back screen 18. In some examples, the light source 14 and imaging device 12 are arranged on a single side of the test specimen 16 and/or back screen 18. Thus, the reflected light might otherwise reflect off of the screen at an angle away from the imaging device 12. The use of a collimating filter concentrates the reflected light in a desired direction (e.g., toward the imaging device). In some examples, the collimating filter includes two or more collimating filters, with a first collimating filter arranged in a first orientation on the back screen 18 and the second collimating filter arranged in a second orientation on the back screen 18 (e.g., orthogonal to the first orientation).

In disclosed examples, the computing device 32 may be used to configure the testing system 33, control the testing system 33, and/or receive measurement data (e.g., transducer measurements such as force and displacement) and/or test results (e.g., peak force, break displacement, etc.) from the testing system 33 for processing, display, reporting, and/or any other desired purposes. The extensometer system 10 connects to the 33 and software utilizing standard interfaces that includes Ethernet, analog, encoder or SPI. This allows the device to be plugged into and used by existing systems without the need for specialized integration software or hardware. The extensometer system 10 provides axial and transverse encoder or analog information in real-time to materials testing machine 33. Real-time video extensometer 10 and materials testing machine 190 exchange real-time test data, including deformation, extension and/or strain data, with the external computer 32, which may be configured via a wired and/or wireless communications channel. The extensometer system 10 provides measurement and/or calculation of deformation, extension and/or strain data captured from the test specimen 16 subjected to testing in the materials testing machine 33, which in turn, provides stress and deformation, extension and/or strain data to the processor 32.

As disclosed herein, the captured images are input to the processor 32 from the imaging device, where one or more algorithms and/or look up tables are employed to calculate multiple axes of deformation, extension and/or strain values for the test specimen 16 (i.e., the change or percentage change in inter-target distance as calculated by image monitoring of the markers 20 affixed to the test specimen 16). Following computation, the data may be stored in memory or output to a network and/or one or more display devices, I/O devices, etc. (see also FIG. 4).

FIG. 2 is an example test specimen 16 for measurement in the extensometer system 10 of FIG. 1. For example, one or more markings are applied to the surface 28 facing the light source 14 and imaging device 12. Grip sections 26 is configured for placement within a grip of the testing system 33 (see also FIG. 4), and apply force to the test specimen 16. For example, a cross-member loader applies force to the specimen 16 under test, while the grips grasp or otherwise couple the test specimen 16 to the testing system 33. A force applicator such as a motor causes the crosshead to move with respect to the frame to apply force to the test specimen 16, as illustrated by double arrow 34. Forces 34 pulling the grip sections 26 away from one another may elongate the test specimen 16, resulting in the markings moving from a first position 20A to a second position 20B. Additionally or alternatively, the markings may change shape or size, which may also be measured by the processing system 32 in view of the captured images. The forces 34 may also cause the edges of the test specimen to move from a first position 22A to a second position 22B. For example, at the first or initial position, the edges have a width 24A, which is reduced to width 24B upon application of the forces 34.

Based on the captured images, the processing system 33 is configured to implement an deformation, extension and/or strain on measurement process. For example, to detect an deformation, extension and/or strain on the test specimen 16, the processing system 33 monitors the images provided via the imaging device 12. When the processing system 33 identifies a change in relative position between two or more of the markers and/or the edges of the test specimen 16 (e.g., compared to an initial location at a beginning of movement of the crosshead), the processing system 33 measures the amount of change to calculate the amount of deformation, extension and/or strain on the test specimen 16. As disclosed herein, the markers are configured to reflect light from the light source to the camera, whereas the back screen reflects light to create a dark silhouette for edge analysis.

Figure 3A:
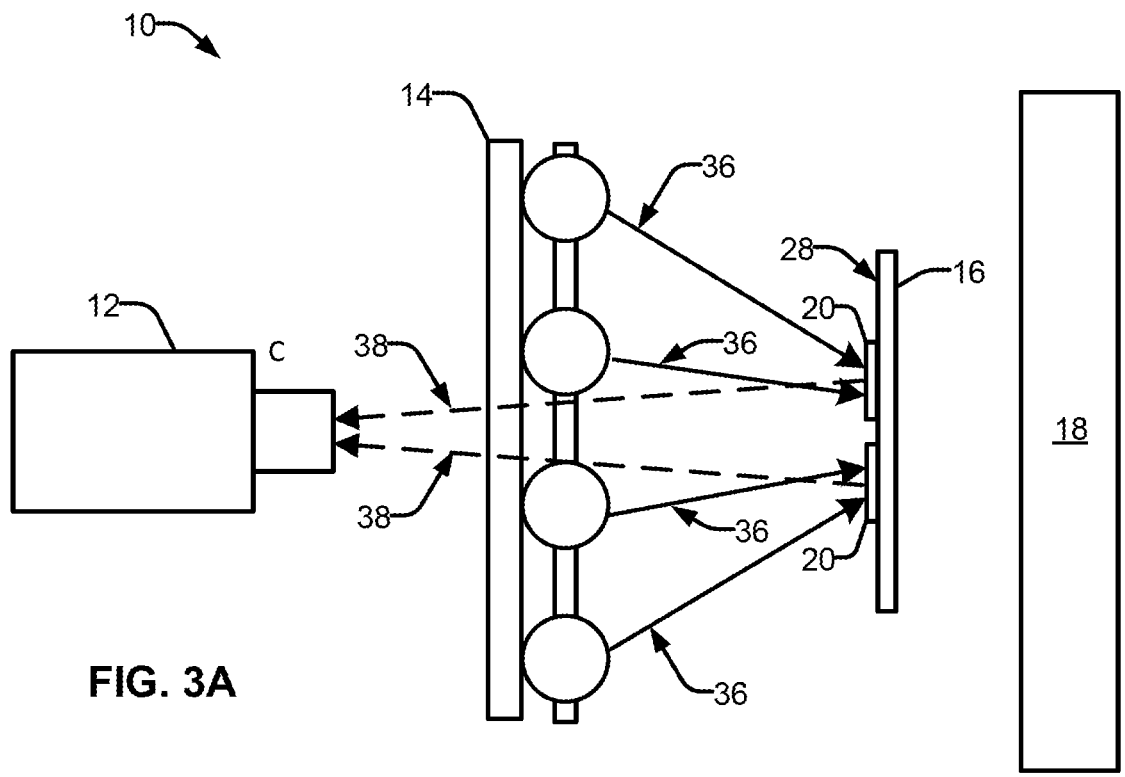
FIGS. 3A and 3B are alternative implementations of the example extensometer system of FIG. 1, in accordance with aspects of this disclosure.
Figure 3B:
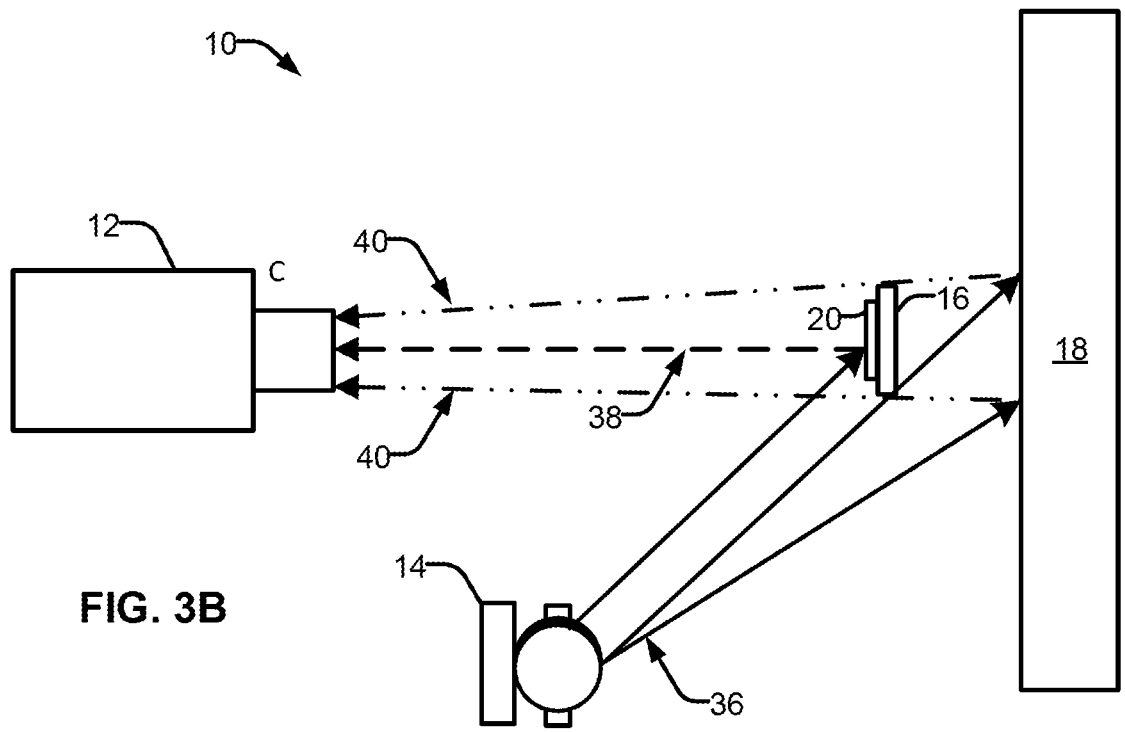

FIGS. 3A and 3B show arrangements for a video extensometer system 10 to measure one or both of axial deformation (based on changes in markers 20 and/or a pattern of markers on the test specimen 16 front surface 28), and transverse deformation (calculated from changes in width of the specimen 16). The components of the video extensometer system 10 are shown in a side perspective in FIG. 3A and a top perspective in FIG. 3B, with general locations of each component relative to the others. As shown, the components include an imaging device 12 (e.g., a video camera) configured to capture one or more images of the test specimen 16 during the physical test (e.g., at regular intervals, continuously, and/or based on one or more threshold values associated with time, force, or other suitable test characteristic).

One or more light sources 14 emit light 36 to illuminate a surface 28 of the test specimen 16 and a screen 18 that is arranged facing a rear surface of the test specimen 16 opposite the light source 14. As shown in FIG. 3A, light 36 incident on markers 20 is reflected back as light 38 directed toward imaging device 12. The reflected light 38 is captured by the imaging device 12 and provided to the processing system 33 to allow for analysis of characteristic changes to the markers 20 during the testing process. In some examples, the light source(s) 14 are arranged to direct light off-axis (e.g., in an upwards, sideways, and/or downwards direction shown from a top elevation in view of FIG. 3B), and angled to illuminate both the front surface 28 of the test specimen 16 and the back screen 18.

As shown, a passive (i.e. lacking active illumination source) back screen 18 is arranged to the rear of the test specimen 16, designed with reflective properties and of a size suitable to present a uniformly bright background to the video extensometer imaging device 12. As shown in FIG. 3B, light 36 incident on back screen 18 is reflected back as light 40 directed toward imaging device 12. The reflected light creates a darkened silhouette of the test specimen 16, allowing the imaging device 12 to capture images of the edges 22, and changes thereof, during the testing process.

The test specimen 16 located between the imaging device 12 and the back screen 18. The test specimen 16 features suitable marks 20 on the front facing surface 28 of the test specimen 16. Analysis of the one or more images associated with the video extensometer system 10 is implemented via processing system 32 to perform identification algorithms that allow both the test specimen 16 markings 20 and the test specimen edges 22 to be continuously tracked and measured during the test process.

FIG. 4 is a block diagram of an example extensometer system 10 of FIG. 1. As shown in FIG. 1, the extensometer system 10 includes the testing system 33 and the computing device 32. The example computing device 32 may be a general-purpose computer, a laptop computer, a tablet computer, a mobile device, a server, an all-in-one computer, and/or any other type of computing device. The computing device 32 of FIG. 4 includes a processor 202, which may be a general-purpose central processing unit (CPU). In some examples, the processor 202 may include one or more specialized processing units, such as FPGA, RISC processors with an ARM core, graphic processing units, digital signal processors, and/or system-on-chips (SoC). The processor 202 executes machine-readable instructions 204 that may be stored locally at the processor (e.g., in an included cache or SoC), in a random access memory 206 (or other volatile memory), in a read-only memory 208 (or other non-volatile memory such as FLASH memory), and/or in a mass storage device 210. The example mass storage device 210 may be a hard drive, a solid-state storage drive, a hybrid drive, a RAID array, and/or any other mass data storage device. A bus 212 enables communications between the processor 202, the RAM 206, the ROM 208, the mass storage device 210, a network interface 214, and/or an input/output interface 216.

An example network interface 214 includes hardware, firmware, and/or software to connect the computing device 201 to a communications network 218 such as the Internet. For example, the network interface 214 may include IEEE 202.X-compliant wireless and/or wired communications hardware for transmitting and/or receiving communications.

An example I/O interface 216 of FIG. 4 includes hardware, firmware, and/or software to connect one or more input/output devices 220 to the processor 202 for providing input to the processor 202 and/or providing output from the processor 202. For example, the I/O interface 216 may include a graphics-processing unit for interfacing with a display device, a universal serial bus port for interfacing with one or more USB-compliant devices, a FireWire, a field bus, and/or any other type of interface. The example extensometer system 10 includes a display device 224 (e.g., an LCD screen) coupled to the I/O interface 216. Other example I/O device(s) 220 may include a keyboard, a keypad, a mouse, a trackball, a pointing device, a microphone, an audio speaker, a display device, an optical media drive, a multi-touch touch screen, a gesture recognition interface, a magnetic media drive, and/or any other type of input and/or output device.

The computing device 32 may access a non-transitory machine-readable medium 222 via the I/O interface 216 and/or the I/O device(s) 220. Examples of the machine-readable medium 222 of FIG. 4 include optical discs (e.g., compact discs (CDs), digital versatile/video discs (DVDs), Blu-ray discs, etc.), magnetic media (e.g., floppy disks), portable storage media (e.g., portable flash drives, secure digital (SD) cards, etc.), and/or any other type of removable and/or installed machine-readable media.

The extensometer system 10 further includes the testing system 33 coupled to the computing device 32. In the example of FIG. 4, the testing system 33 is coupled to the computing device 32 via the I/O interface 216, such as via a USB port, a Thunderbolt port, a FireWire (IEEE 1394) port, and/or any other type serial or parallel data port. In some examples, the testing system 33 is coupled to the network interface 214 and/or to the I/O interface 216 via a wired or wireless connection (e.g., Ethernet, Wi-Fi, etc.), either directly or via the network 218.

The testing system 33 includes a frame 228, a load cell 230, a displacement transducer 232, a cross-member loader 234, material fixtures 236, and a control processor 238. The frame 228 provides rigid structural support for the other components of the testing system 33 that perform the test. The load cell 230 measures force applied to a material under test by the cross-member loader 234 via the grips 236. The cross-member loader 234 applies force to the material under test, while the material fixtures 236 (also referred to as grips) grasp or otherwise couple the material under test to the cross-member loader 234. The example cross-member loader 234 includes a motor 242 (or other actuator) and a crosshead 244. The crosshead 244 couples the material fixtures 236 to the frame 228, and the motor 242 causes the crosshead to move with respect to the frame to position the material fixtures 236 and/or to apply force to the material under test. Example actuators that may be used to provide force and/or motion of a component of the extensometer system 10 include electric motors, pneumatic actuators, hydraulic actuators, piezoelectric actuators, relays, and/or switches.

While the example testing system 33 uses a motor 242, such as a servo or direct-drive linear motor, other systems may use different types of actuators. For example, hydraulic actuators, pneumatic actuators, and/or any other type of actuator may be used based on the requirements of the system.

Example grips 236 include compression platens, jaws or other types of fixtures, depending on the mechanical property being tested and/or the material under test. The grips 236 may be manually configured, controlled via manual input, and/or automatically controlled by the control processor 238. The crosshead 244 and the grips 236 are operator-accessible components.

The extensometer system 10 may further include one or more control panels 250, including one or more mode switches 252. The mode switches 252 may include buttons, switches, and/or other input devices located on an operator control panel. For example, the mode switches 252 may include buttons that control the motor 242 to jog (e.g., position) the crosshead 244 at a particular position on the frame 228, switches (e.g., foot switches) that control the grip actuators 246 to close or open the pneumatic grips 248, and/or any other input devices to control operation of the testing system 33.

The example control processor 238 communicates with the computing device 32 to, for example, receive test parameters from the computing device 32 and/or report measurements and/or other results to the computing device 32. For example, the control processor 238 may include one or more communication or I/O interfaces to enable communication with the computing device 32. The control processor 238 may control the cross-member loader 234 to increase or decrease applied force, control the fixture(s) 236 to grasp or release a material under test, and/or receive measurements from the displacement transducer 232, the load cell 230 and/or other transducers.

The example control processor 238 is configured to implement an deformation, extension and/or strain measurement process when a test specimen 16 is subjected to testing in the testing system 33. For example, to detect an deformation, extension and/or strain on the test specimen 16, the control processor 238 monitors the images provided via the imaging device 12. When the control processor 238 identifies a change in relative position between two or more of the markers 20 and/or the edges 22 of the test specimen 16 (e.g., compared to an initial location at a beginning of movement of the crosshead 244), the control processor 238 measures the amount of change to calculate the amount of extension and/or strain on the test specimen 16. For example, real-time video provided by the imaging device 12 captures the absolute position of markers 20 and/or edges 22, and monitors their relative movement over the course of the several images to calculate deformation, extension and/or strain in real time. The stress data and the deformation, extension and/or strain data exchanged among the real-time video extensometer 10, the testing system 33 and the processing system 32, and typically organized and displayed via the display device 224.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer-readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine-readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. An extensometer system for measuring deformation on a test specimen comprising:
   one or more light sources to direct light to a surface of a test specimen and a screen including a collimating filter, wherein the test specimen is arranged between the one or more light sources and the screen; and
   an imaging device to capture images of the test specimen while subjected to a stress-inducing force via a testing system, the imaging device configured to transmit the images to a processor to calculate deformation of the test specimen as a result of the stress-inducing force.

2. The extensometer system of claim 1, further comprising a processor configured to:
   receive two or more images of the test specimen from the imaging device; and
   compare a first image to a second image to determine a change in a characteristic of the test specimen as a result of the stress-inducing force.

3. The extensometer system of claim 2, wherein the test specimen further comprises one or more markers arranged on the surface of the test specimen.

4. The extensometer system of claim 3, wherein the characteristic is one of a size, shape or location of the one or more markers.

5. The extensometer system of claim 2, wherein the characteristic is one of a size, shape or location of an edge of the test specimen.

6. The extensometer system of claim 1, wherein deformation is determined in two orthogonal directions.

7. The extensometer system of claim 1, wherein deformation is determined in the axial direction and in the transverse direction.

8. The extensometer system of claim 1, wherein the light source emits polarized light or infrared light.

9. The extensometer system of claim 8, wherein the imaging device is configured to capture polarized light or infrared light reflected from the screen or the test specimen, wherein the markers reflect light from the light source to the imaging device and the screen reflects light to create a dark silhouette of the test specimen for edge analysis.

10. The extensometer system of claim 1, wherein the light source or the imaging device further comprises a filter.

11. The extensometer system of claim 1, further including an auxiliary camera link connector input for receiving an image of the test specimen, which is subjected to a stress-inducing load.

12. The extensometer system of claim 1, wherein the processor includes a field programmable gate array.

13. The extensometer system of claim 1, wherein the processor and the field programmable gate array are located on the single circuit board.

14. An extensometer system for measuring deformation extension/strain on a test specimen comprising:
- a testing system to subject a test specimen to one or more forces;
- one or more light sources to direct light to a surface of the a test specimen and a screen including a collimating filter, wherein the test specimen is arranged between the one or more light sources and the screen; and
- an imaging device to capture images of the test specimen while subjected to a stress-inducing force via the testing system, the imaging device configured to transmit the images to a processor to calculate deformation of on the test specimen as a result of the stress-inducing force.

15. The extensometer system of claim 14, wherein the collimating filter comprises a first collimating filter and a second collimating filter, the first collimating filter arranged in a first orientation on the screen and the second collimating filter arranged in a second orientation on the screen different from the first orientation.

16. The extensometer system of claim 14, wherein the screen further comprises a reflective filter.

17. An extensometer system for measuring deformation on a test specimen comprising:
- a screen comprising a reflective surface;
- one or more light sources to direct light to a front surface of the a test specimen and the reflective surface of the screen, wherein the test specimen is arranged between the one or more light sources and the screen, wherein the one or more light sources are arranged off-axis and angled relative to the screen and the test specimen to direct light to illuminate both the front surface of the test specimen and the screen; and
- an imaging device to capture images of the test specimen while subjected to a stress-inducing force via the a testing system, wherein the images are generated from light reflected from one or markers on the test specimen or from light reflected from the screen to create a silhouette of the test specimen.

18. The extensometer system of claim 17, wherein the imaging device is configured to transmit the images to a processor to calculate deformation of on the test specimen as a result of the stress-inducing force.

19. The extensometer system of claim 17, further comprising a testing system to subject the test specimen to one or more forces to provide the stress-inducing force.

20. The extensometer system of claim 17, wherein the image capture system is arranged at an angle based on an angle of incidence of light on one or both of the test specimen or the back screen.

* * * * *